United States Patent
Burney et al.

(10) Patent No.: US 7,257,655 B1
(45) Date of Patent: Aug. 14, 2007

(54) EMBEDDED PCI-EXPRESS IMPLEMENTATION

(75) Inventors: Ali H. Burney, Fremont, CA (US); Sanjay Charagulla, San Jose, CA (US); Daniel Mansur, Emerald Hills, CA (US)

(73) Assignee: Altera Corporation, San Jose, CA (US)

( * ) Notice: Subject to any disclaimer, the term of this patent is extended or adjusted under 35 U.S.C. 154(b) by 235 days.

(21) Appl. No.: 10/964,979

(22) Filed: Oct. 13, 2004

(51) Int. Cl.
*G06F 13/42* (2006.01)
*G06F 12/00* (2006.01)
*H04K 1/00* (2006.01)

(52) U.S. Cl. .......................... 710/105; 710/62; 710/72; 710/305; 710/315; 710/260; 370/436; 370/469; 370/408; 380/268; 711/103

(58) Field of Classification Search ............... 710/105, 710/62, 72, 305, 315, 260; 370/463, 469; 711/103; 380/268
See application file for complete search history.

(56) References Cited

U.S. PATENT DOCUMENTS

| | | | |
|---|---|---|---|
| 6,691,193 B1* | 2/2004 | Wang et al. ................. | 710/200 |
| 6,871,154 B2* | 3/2005 | Byrn et al. .................. | 702/117 |
| 6,879,598 B2* | 4/2005 | Zancan et al. ............... | 370/463 |
| 6,948,105 B2* | 9/2005 | Rajsuman .................... | 714/724 |
| 6,976,102 B1* | 12/2005 | Groen et al. .................. | 710/72 |
| 6,993,602 B2* | 1/2006 | Merrill et al. ................. | 710/54 |
| 7,020,729 B2 | 3/2006 | Taborek et al. | |
| 7,080,190 B2* | 7/2006 | Weber ......................... | 710/315 |
| 7,152,136 B1* | 12/2006 | Charagulla ................... | 710/315 |
| 2005/0066085 A1 | 3/2005 | Kobayashi | |
| 2005/0120163 A1* | 6/2005 | Chou et al. .................. | 711/103 |
| 2005/0259685 A1 | 11/2005 | Chang et al. | |
| 2006/0093147 A1* | 5/2006 | Kwon et al. .................. | 380/268 |
| 2006/0095613 A1* | 5/2006 | Venkata et al. ............... | 710/62 |
| 2006/0114918 A1* | 6/2006 | Ikeda et al. .................. | 370/408 |

OTHER PUBLICATIONS

PCI Express Base Specification Revision 1.0—Apr. 29, 2002—pp. 1, 43, and 56.*
PHY Interface for the PCI Express Architecture—Jun. 19, 2003—pp. 1, 6, 7, and 14.*
"Artisan and Cascade Semiconductor Solutions Collaborate to Validate PCI Express IP Interoperability"—Mar. 25, 2004—3 pages.*
XILINX—RocketIO Transreceiver Bit-Error Rate Tester—Feb. 12, 2004.
U.S. Appl. No. 10/911,212, Office Act ion mailed Apr. 28, 2006.
Charagulla, Sanjay, "Implementation of PCI Express", Altera Corporation, U.S. Appl. No. 10/911,212, filed Aug. 3, 2004, pp. 1-32.
StorageTek: The leader in Information lifecycle management solutions, http://www.storagetek.com/, printed on Aug. 3, 2005, 1 pages.
Bhatt, Ajay V., "Creating a Third Generation I/O Interconnect", Intel® Developer Network for PCI Express* Architecture, www.express-lane.org, pp. 1-11, Jun. 2003.
PCI Express, PCI Express Core Getting Started: Xilinx, Version 1.4.2, Apr. 2005, Copyright © PLDApplications 1996-2005.

* cited by examiner

*Primary Examiner*—Mark H. Rinehart
*Assistant Examiner*—Brian Misiura
(74) *Attorney, Agent, or Firm*—Beyer Weaver LLP

(57) ABSTRACT

Methods and apparatus provide PCI Express support on a programmable device. A device includes a hard-coded transceiver that supports functionality associated with the PCI Express physical layer and link layer. The hard-coded transceiver can also support part of the PCI Express transaction layer. Soft-coded logic is used to support higher layer functionality including a portion of the transaction layer to allow custom configuration of PCI Express features such as virtual channels, buffers, prioritization, and quality of service characteristics. The hybrid solution reduces logic resource cost and provides an effective custom configurable solution.

27 Claims, 11 Drawing Sheets

| Feature 501 | Transceiver 503 | Interference Logic 505 |
|---|---|---|
| Comma Detection 505 | Yes | / |
| 8b 10b Encoding/Decoding 513 | Partial | Yes |
| Elastic Buffer 515 | Yes | / |
| Error + Status Reporting 517 | No | Yes |

Figure 5

EMBEDDED PCI-EXPRESS IMPLEMENTATION

CROSS REFERENCE TO RELATED APPLICATIONS

The present application is related the U.S. patent application Ser. No. 10/911,212 titled Implementation of PCI Express by Sanjay Charagulla, filed on Aug. 3, 2004, the entirety of which is incorporated by reference in its entirety.

BACKGROUND OF THE INVENTION

1. Field of the Invention

The present invention relates to supporting PCI Express. In one example, the present invention relates to methods and apparatus for implementing a device having both hard-coded and soft-coded PCI Express support.

2. Description of Related Art

PCI Express is a low-cost, scalable, switched, point-to-point, serial I/O interconnection scheme that maintains backward compatibility with PCI. PCI Express provides a number of benefits over existing bus standards, including increased bandwidth availability and support for real-time data transfer services. PCI Express provides quality of service, power management, and I/O virtualization features. Quality of service and power management improve data integrity and allow control of power consumption. I/O virtualization allows data to be routed along logical routes such as virtual channels, permits allocation of bandwidth to groups of devices, and provides the ability to prioritize traffic streams.

Many existing devices fail to fully and efficiently support PCI Express. Some devices only support PCI Express in very specific configurations. For example, some Application Specific Standard Products (ASSPs) and Application Specific Integrated Circuits (ASICs) may have PCI Express support but only for a specified number of channels. Some other devices such as programmable chips can support PCI Express but only by using a relatively large amount of logic resources.

Consequently, it is desirable to provide improved techniques and mechanisms for providing PCI Express support that overcome at least some of the limitations of existing devices.

SUMMARY OF THE INVENTION

Methods and apparatus provide PCI Express support on a programmable device. A device includes a hard-coded transceiver that supports functionality associated with the PCI Express physical layer and link layer. The hard-coded transceiver can also support part of the PCI Express transaction layer. Soft-coded logic is used to support higher layer functionality including a portion of the transaction layer to allow custom configuration of PCI Express features such as virtual channels, buffers, prioritization, and quality of service characteristics. The hybrid solution reduces logic resource cost and provides an effective custom configurable solution.

In one embodiment, a programmable chip is provided. The programmable chip includes hard-coded PCI Express physical layer and link layer circuitry. The hard-coded PCI Express physical layer circuitry is configured to perform physical packet processing. The hard-coded PCI link layer circuitry is operable to perform link packet processing. The programmable chip also includes soft-coded PCI Express transaction layer circuitry. The soft-coded PCI Express transaction layer circuitry is customizable to provide support for a plurality of virtual channels.

In some embodiments, the programmable chip also includes hard-coded PCI Express transaction layer circuitry. The hard-coded PCI Express transaction layer circuitry is operable to perform transaction layer packet processing.

In another embodiment, a method for implementing a device supporting PCI Express is described. Hard-coded PCI Express physical layer circuitry is provided on a device. The hard-coded PCI Express physical layer circuitry is configured to perform physical packet processing. Hard-coded PCI Express link layer circuitry coupled to the hard-coded PCI Express physical layer circuitry is also provided on the device. The hard-coded PCI link layer circuitry operable to perform link packet processing. Soft-coded PCI Express transaction layer circuitry is implemented on the device. The soft-coded PCI Express transaction layer circuitry is customizable to provide support for a plurality of virtual channels.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 5 is a table representation showing an example of functionality not support by a PCI transceiver.

DETAILED DESCRIPTION OF SPECIFIC EMBODIMENTS

Figure 1:
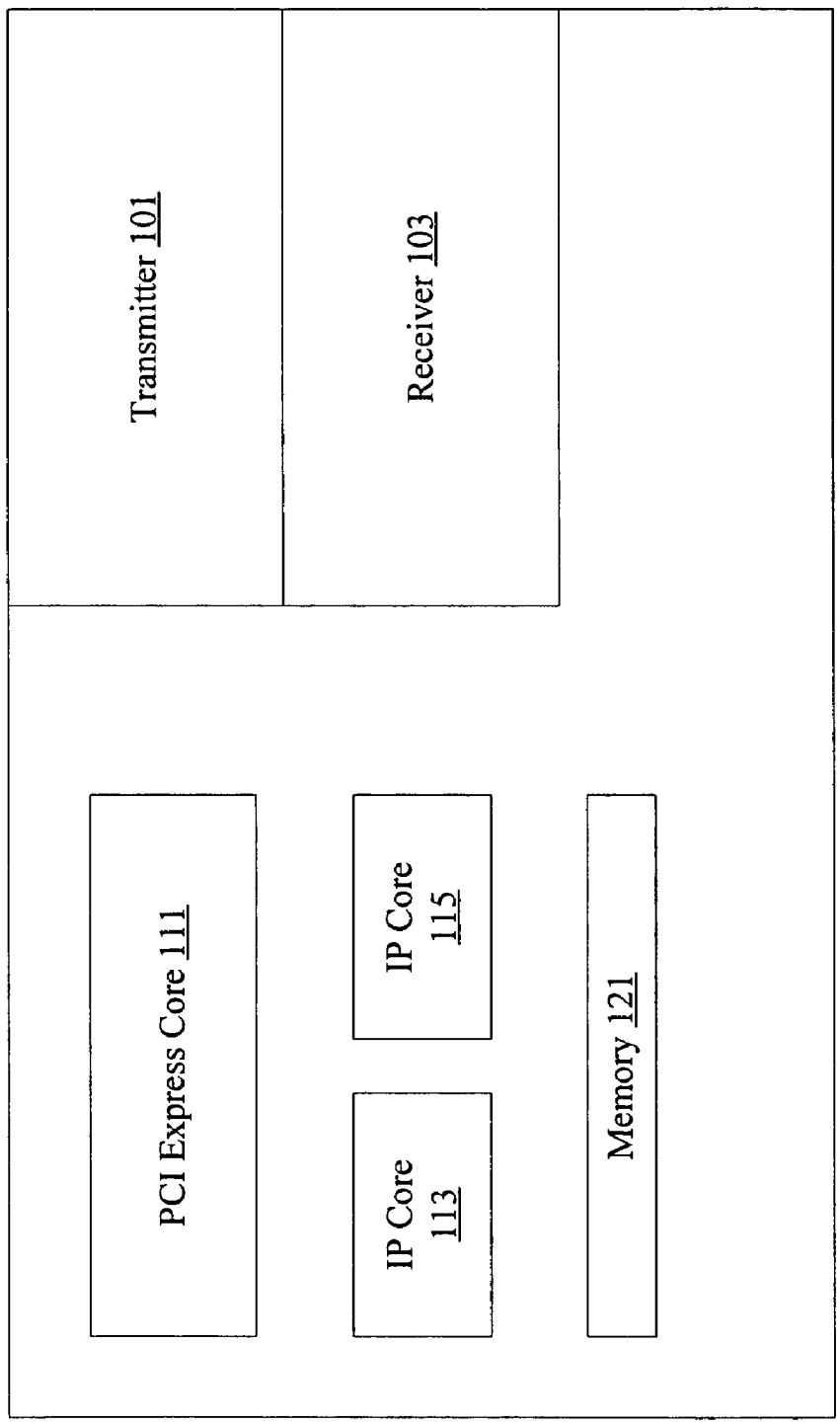
FIG. 1 is a diagrammatic representation of a programmable chip that can be used to implement the techniques and mechanisms of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular processors and devices. However, it should be noted that the techniques of the present invention can be applied to a variety of types of processors and devices and associated software. In the following description, numerous specific details are set forth in order to provide a thorough understanding of the present invention. The present invention may be practiced without some or all of these specific details. In other instances, well known process operations have not been described in detail in order not to unnecessarily obscure the present invention. Techniques and mechanisms are also often associated with certain processes and components that are optional, unless noted otherwise. Optional processes and components may sometimes be removed or introduced into particular process flows or devices without affecting the operation of the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

The peripheral components interface (PCI) bus is an input/output (I/O) mechanism that allows the interconnection of system components and interfaces, such as processors, memory, timers, hardware accelerators, and network devices. PCI includes a number of advantages over previous bus implementations. PCI has processor independence, and is not tied to any particular processor family or version. PCI supports buffered isolation that essentially isolates, both electrically and by clock domains, the processor bus from the PCI bus. This allows the running of concurrent cycles on the PCI bus and the processor bus while also allowing increases in processor local bus frequency independent of PCI bus speed. The PCI bus supports bus mastering, allowing master components to gain access to the PCI bus through an arbitration process and control a particular slave device directly, as opposed to waiting for the host processor to service the device. Plug-and-play operation is also supported. Plug-and-play operation permits devices to be automatically detected and configured, eliminating the need to manually set switches and jumpers for base addresses and interrupts.

Although PCI has gained wide acceptance, PCI also has a number of limitations. PCI is a synchronously clocked, parallel bus scheme that requires rigid timing alignment. Consequently, while processors and other components have increased clock speeds by many orders of magnitude, PCI remains largely locked to its near original clock frequency. PCI bandwidth limitations, pin-count limitations as well as lack of support for real-time data transfer services. Applications such as high speed data transfers and multimedia applications require guaranteed bandwidth and deterministic latency. PCI also lacks quality of service, power management, and I/O virtualization features. Quality of service and power management improve data integrity and allow control of power consumption. I/O virtualization allows data to be routed along logical routes, permits allocation of bandwidth to groups of devices, and provides the ability to prioritize traffic streams. A core limitation of PCI, however, is that all available bandwidth is shared by all components connected to the bus. In many instances, a single device can consume all of the available bandwidth on a PCI bus.

The limitations of PCI have led to the development of a number of newer interconnection standards, including PCI Express, formerly known as 3GIO or third generation I/O. PCI Express is a low-cost, scalable, switched, point-to-point, serial I/O interconnection scheme that maintains backward compatibility with PCI. The PCI Express architecture is specified using an Open System Interconnection (OSI) layer model and uses a load-store addressing architecture with a flat address space to allow interoperability with existing PCI applications. The software layers generate read and write requests that are transported by the transaction layer to the I/O devices using a packet-based, split-transaction protocol. The link layer adds sequence numbers and CRC to these packets to create a highly reliable data transfer mechanism. The basic physical layer includes a dual simplex channel that is implemented as a transmit pair and a receive pair.

Many existing devices fail to fully and efficiently support PCI Express. Some devices only support PCI Express in very specific configurations. For example, some Application Specific Standard Products (ASSPs) and Application Specific Integrated Circuits (ASICs) may have PCI Express support but only for a particular number of virtual channels or specific buffer sizes. Traffic shaping and packet prioritization configurability may also be limited. Some other devices such as programmable chips can support PCI Express but only by using a relatively large amount of logic resources.

Some programmable chips are configured with hard-coded transceivers that are not fully compatible with PCI Express. Wrapper layers are often used to allow implementation of PCI Express on certain programmable chips. In some examples, interface circuitry is provided with devices having a hard-coded transceiver to allow a PCI Express intellectual property core to operate with a conventional transceiver. Any transceiver that does not support PCI Express is referred to herein as a PCI Express incompatible transceiver. In some examples, the PCI Express incompatible transceiver supports XAUI and Fibre Channel. Interface circuitry can perform physical layer and link layer operations to supplement transceiver functionality.

Although a wrapper layer or interface circuitry provides an effective solution for implementing PCI Express on a programmable chip having a built in transceiver, the techniques of the present invention provide further improvements. According to various embodiments, a programmable chip includes a transceiver that is fully compatible with PCI Express. Support for physical layer and link layer PCI Express operations are hard-coded onto a programmable chip. Certain transaction layer operations can also be implemented using hard-coded logic. Customizable options such as the number of virtual channels, virtual channel addresses, buffer sizes, traffic shaping parameters, etc., are implemented using soft-coded logic. In some examples, a portion of the transaction layer is implemented in hard-coded logic while another portion is implemented in soft-coded logic. The techniques of the present invention allow implementation of a hybrid solution that offers the customizability of a programmable chip and the cost and processing efficiency of a hard-coded device.

FIG. 1 is a diagrammatic representation showing one example of a programmable chip having a hard-coded transceiver. Although a programmable chip is shown, the techniques of the present invention may be applicable to ASSPs and ASICs as well. According to various embodiments, the system includes a PCI Express core 111, memory 121, a hard-coded transceiver including transmitter 101 and receiver 103, as well as other IP cores 113 and 115. In some examples, the programmable chip can also include a processor, a hardware accelerator, and a timer. A variety of components including primary and slave components can be included. It should be noted that the system can include both on-chip memory 117 and off-chip memory.

The programmable chip has a hard-coded transceiver that may be used to support a variety of transmission standards. The programmable chip also has different types of resources that can be used interchangeably in different allocations to implement components on the programmable chip. In one example, the programmable chip has hardwired circuitry for the built in transceiver and uses logic elements for implementing each of the various cores on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of lookup tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register. In other examples, a logic element is an adaptive logic module (ALM) that provides 8 inputs, allowing it to efficiently support various configurations such as 6-input or 7-input lookup tables or two independent 4-input lookup tables.

Figure 2:
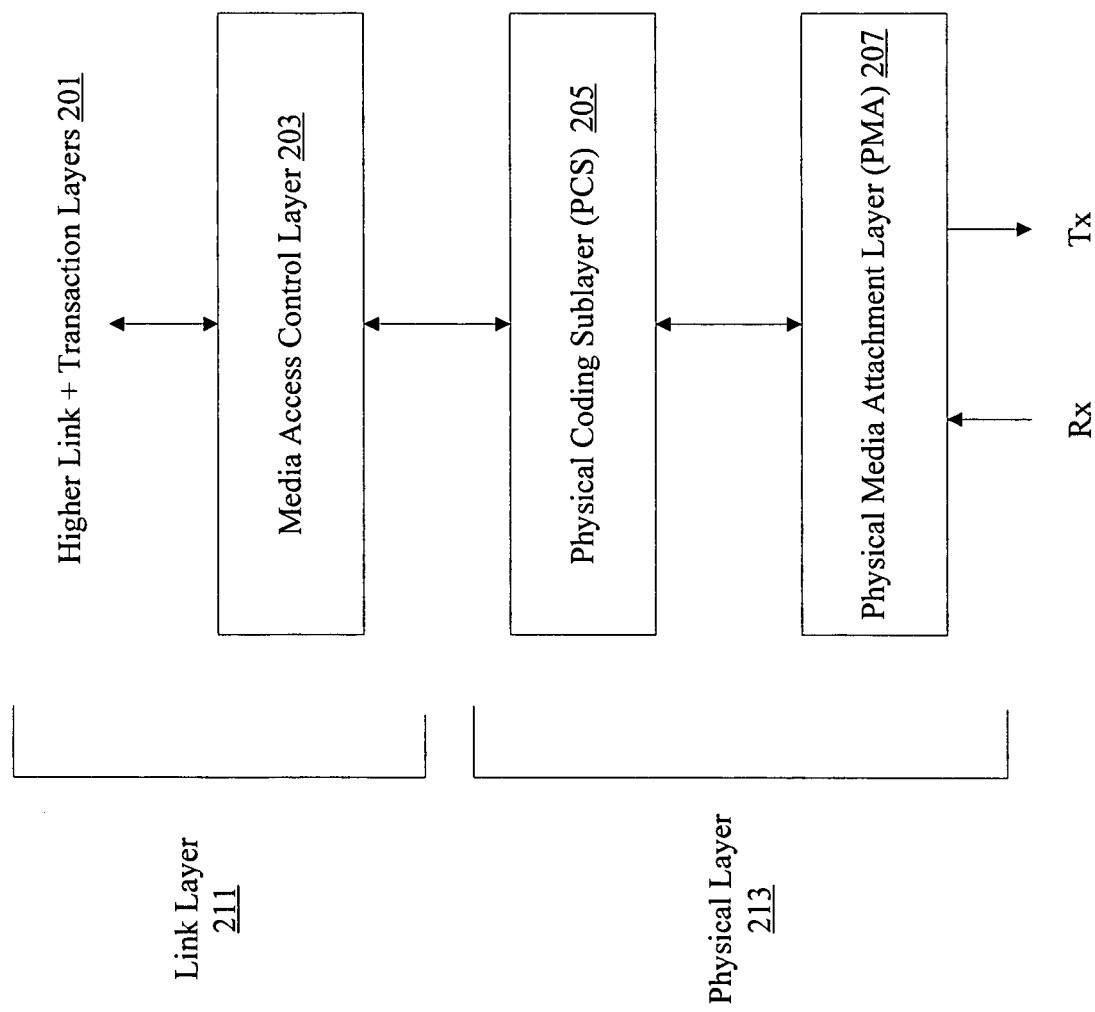
FIG. 2 is a diagrammatic representation showing a PCI Express system level implementation.

FIG. 2 is a diagrammatic representation of an example of a PCI Express layer model. PCI Express includes a physical layer 213 having a Physical Coding Sublayer (PCS) 205 and a Physical Media Attachment Layer (PMA) 207. A PCI Express link typically includes two low-voltage AC-coupled differential pairs of signals (a transmit pair and a receive pair). The physical link signal uses a de-emphasis scheme to reduce intersymbol interference, thus improving data integrity. A data clock is embedded using the 8b/10b encoding scheme to achieve high data rates. The physical layer transports packets between the link layers of two PCI Express agents.

The link layer 211 includes Media Access Control Layer 203. The link layer primarily provides reliable delivery of packets across a PCI Express link. The link layer is responsible for data integrity and adds a sequence number and checksum information (CRC) to the transaction layer packet.

Higher link and transaction layers 201 are also used. Most packets are initiated at the transaction layer. A credit-based, flow control protocol is used to ensure that packets are transmitted only when buffer space is available. The link layer will automatically retransmit a corrupted or dropped packet. The transaction layer receives read and write requests from the software layer and creates request packets and transmission to the link layer. The transaction layer also receives response packets from the link layer and matches these with the original software requests. Each packet has an identifier that enables response packets to be directed to the correct originator. Packets can also have attributes such as "no-snoop," "relaxed ordering" and "priority," which may be used to route packets optimally through an I/O subsystem.

Figure 3:
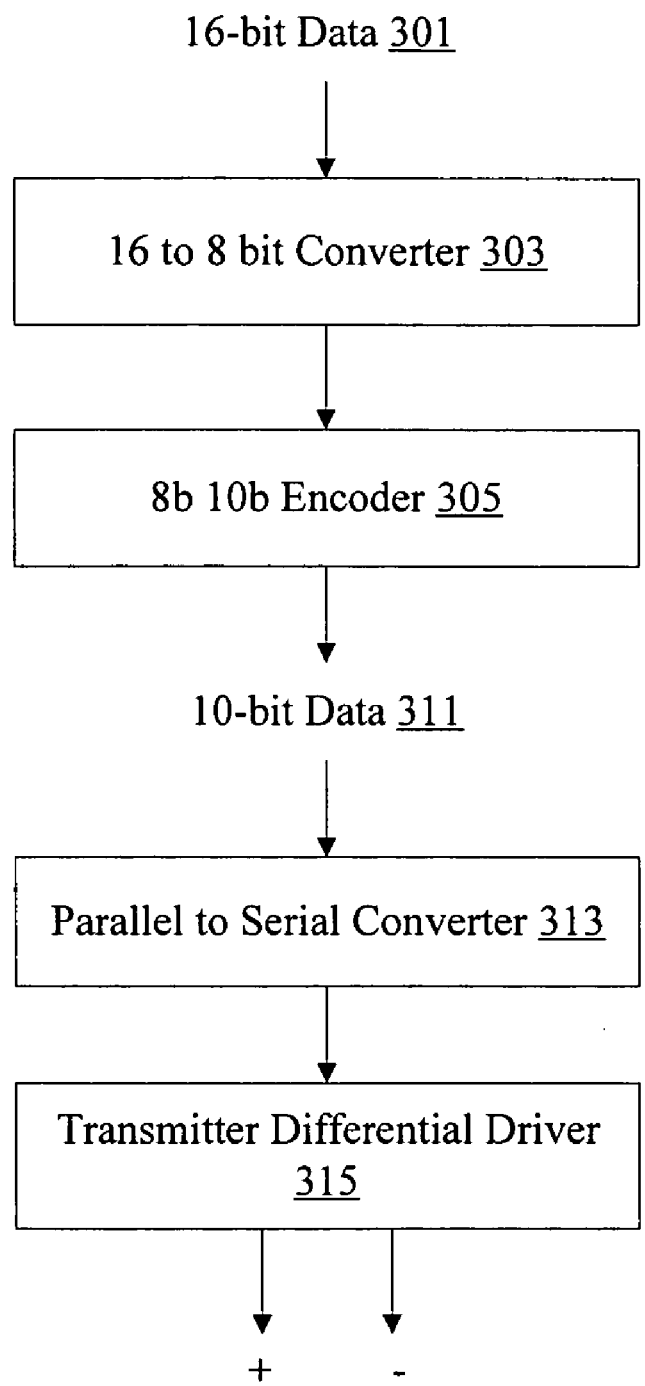
FIG. 3 is a diagrammatic representation showing a PCI Express transmitter.

FIG. 3 is a diagrammatic representation showing a transmitter that is used with a wrapper layer to provide PCI Express support. As noted above, some transceivers use wrapper layers to provide full PCI Express support, while others do not use wrapper layers. Wrappers provide an effective solution for supporting PCI Express on devices that have PCI Express incompatible transceivers. According to various embodiments, 16-bit data 301 is passed to a 16-bit to 8-bit converter 303. It should be noted that although 16-bit data is provided, data of various lengths can be transmitted in a similar manner. The 8-bit data can then be converted to a 10-bit format using an 8b/10b encoder 305. 8b/10b encoding balances zeros and ones in a data stream to increase signal integrity. Some programmable chips with built in transceivers have 8b/10b encoders, but the transceivers typically do not support the full set of codes required for PCI Express compliance. Consequently, a wrapper layer with an augmented 8b/10b encoder is provided to fully support the 8b/10b code set. Any encoder supporting substantially the full set of codes required for PCI Express compliance is referred to herein as an augmented 8b/10b encoder.

In some examples, the augmented 8b/10b encoder replaces the encoder provided by a hard-coded transceiver. In other examples, the augmented 8b/10b encoder performs operations on particular codes. 10-bit data 311 is then passed to a parallel to serial converter 313. The transmitter differential driver 315 is then used to send the data. According to various embodiments, PCI Express requires the transmitter to be able to force negative disparity in 8b/10b encoding. However, some transceivers are only able to force positive disparity. The inclusion of 8b/10b encoder allows the selection of negative disparity in compliance with the PCI Express specification.

Figure 4:
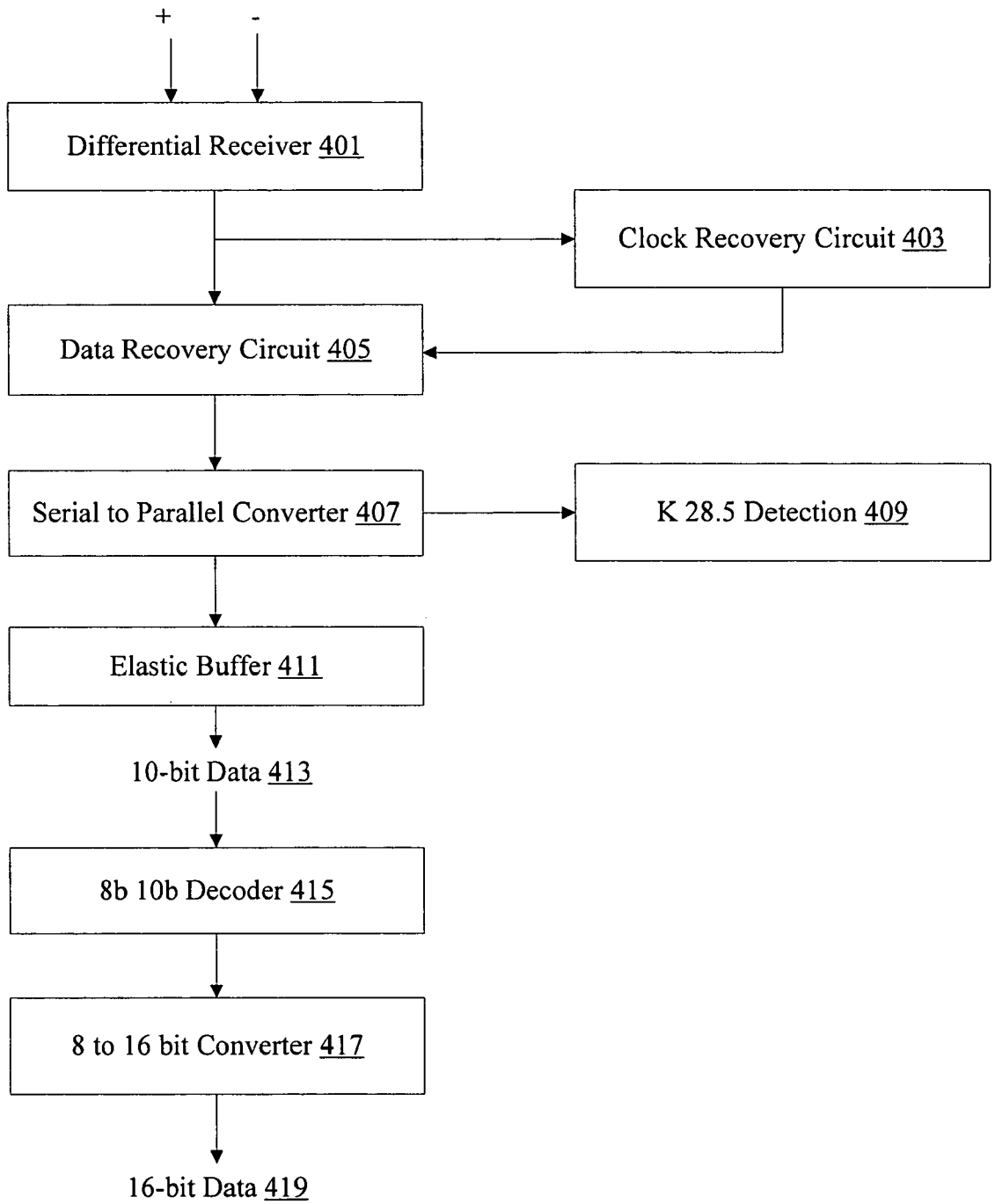
FIG. 4 is a diagrammatic representation showing a PCI Express receiver.

FIG. 4 is a diagrammatic representation showing one example of a receiver that is used with a wrapper layer to provide PCI Express support. The differential receiver 401 is coupled to a clock recovery circuit 403 and a data recovery circuit 405. The clock and data recovery units 403 and 405 extract clock information from the incoming serial data stream. The recovered clock is then used to sample the serial data stream and clock the deserializer 407. Receive data and clock information is passed to the serial to parallel converter/deserializer 407. The deserializer 407 converts the incoming high-speed serial data stream to a lower-speed parallel interface such as an 8-, 10-, 16-, or 20-bit parallel interface. K28.5 detection is performed at 409. An elastic buffer 411 provides 10-bit data 413 to an 8b/10b decoder 415. An optional 8-bit to 16-bit converter 417 provides 16-bit data 419. According to various embodiments, transceivers typically do not support Rx polarity inversion. Consequently, interface circuitry or wrapper logic enables the inversion to be performed on the data before it goes into the 8b/10b decoder.

FIG. 5 is a table representation showing features supported by one example of a transceiver that is used with a wrapper layer. According to various embodiments, the features not supported by a transceiver 503 are supported by interface logic 505. In one example, transceiver 503 supports comma detection 511, provides an elastic buffer 515, and provides partial 8b/10b encoding and decoding 513. A transceiver 503 however does not support any error status reporting 517. According to various embodiments, comma detection 511 allows a transceiver to detect idle states. The elastic buffer is used to compensate for differences in frequencies between bit rates at the two ends of a link. In some examples, the elastic buffer can store at least seven symbols to handle frequency and interval differences. Error and status codes can include some of the following:

0, 0, 0: Received data OK
    0, 0, 1: 1 SKP added
    0, 1, 0: 1 SKP removed
    0, 1, 1: Receiver detected
    1, 0, 0: 8B/10B decode error
    1, 0, 1: Elastic Buffer overflow
    1, 1, 0: Elastic Buffer underflow Because the built in transceiver may not fully support PCI Express, interface logic 505 is provided to handle cases the transceiver can not. In one example, a transceiver is hard-coded on a programmable chip. Interface logic 505, however, can be configured using programmable logic. Interface logic 505 allows a transceiver to interact with PCI Express cores. PCI Express interface logic can provide support for 8b/10b encoding 513 while also supporting error and status reporting 517. In some examples, interface logic 505 performs 8b/10b encoding/decoding while the 8b/10b encoder/decoder hard-coded as part of the transceiver is left unused. In other examples, interface logic 505 handles particular encodes and decodes while the transceiver 503 handles other encodes and decodes.

Figure 6:
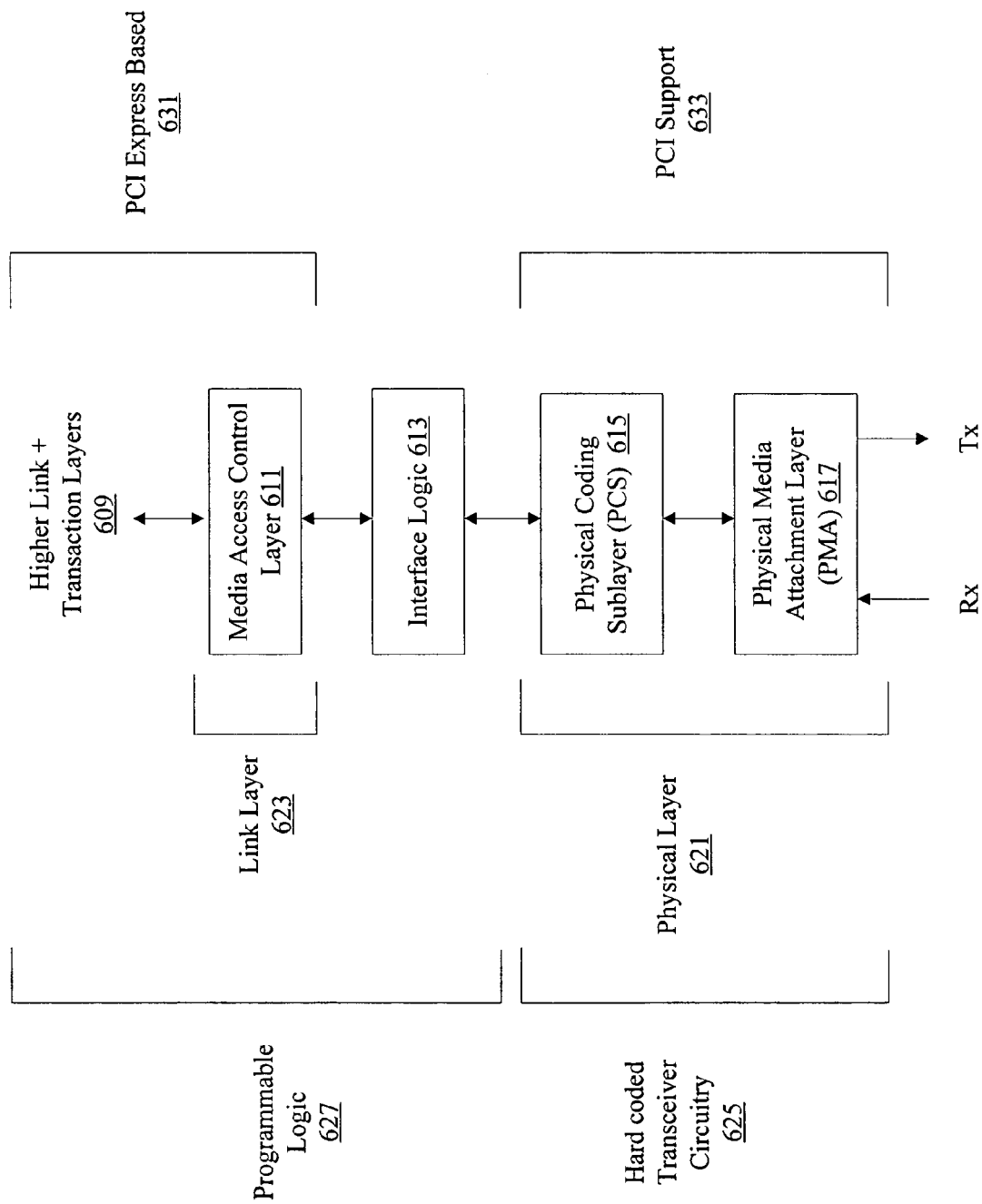
FIG. 6 is a diagrammatic representation showing a PCI Express system level implementation with interface circuitry.

FIG. 6 is a diagrammatic representation of one example of a PCI Express architecture using a wrapper layer or interface logic. Hard coded transceiver circuitry 625 is primarily configured to perform physical layer 621 operations, although some operations associated with other layers may also be performed. The physical layer 621 includes the physical coating sublayer (PCS) 615 and the physical media attachment layer (PMA) 617. According to various embodiments, hard coded transceiver circuitry 625 is PCI Express incompatible. According to various embodiments, programmable logic 627 provides support for a link layer 623, although operations associated with other layers may also be supported. A link layer 623 includes media access control layer 611 coupled to higher link and transaction layers 609. In one example, programmable logic 627 is a PCI Express core. The PCI Express core may be provided from a standard programmable logic library. The intellectual property core is PCI Express 631 based and typically could not run on a hard-coded transceiver.

Consequently, the techniques of the present invention provide interface logic 613 to make the PCI Express programmable logic core compatible with a transceiver. Interface logic 613 may perform a variety of physical layer 621, link layer 623, and/or other operations. Such operations may replace operations performed by the built in transceiver or may supplement transceiver components.

Wrapper layers or interface logic provide an effective solution for supporting PCI Express on devices that have PCI Express incompatible transceivers. However, the techniques of the present invention provide an even more effective mechanism for providing PCI Express support.

Figure 7:
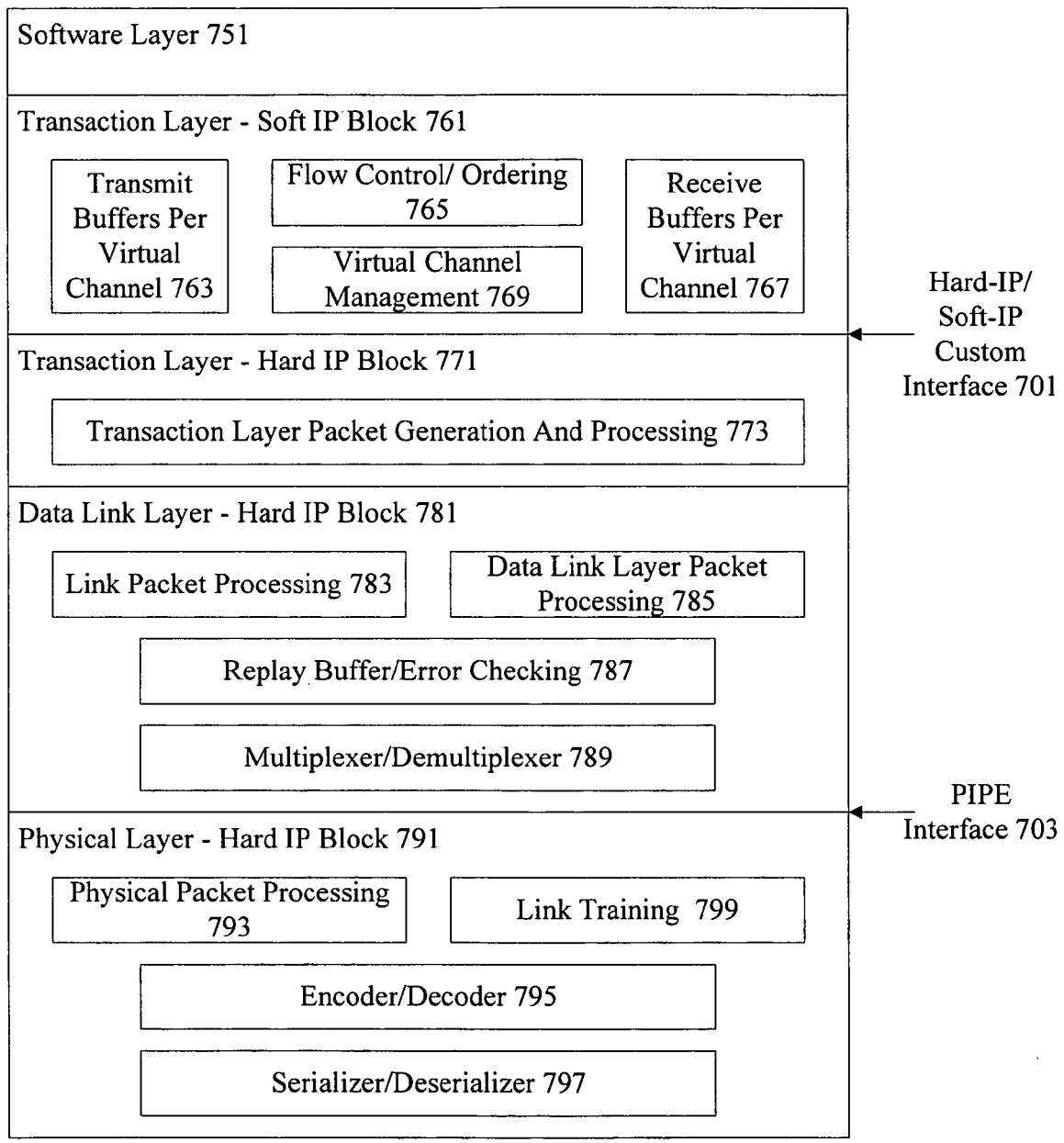
FIG. 7 is a diagrammatic representation showing a device supporting PCI Express.

FIG. 7 is a diagrammatic representation showing a soft-IP/hard-IP interface or a soft-coded/hard-coded logic interface. As will be appreciated, circuitry implemented using gates or nonprogrammable logic is referred to herein as hard-coded logic or hard-IP. Circuitry implemented using programmable logic mechanisms such as lookup tables are referred to herein as soft-coded logic or soft-IP. PCI Express includes a physical layer Hard-IP block 791 that includes a serializer/deserializer 797, and encoder/decoder 795, mechanisms for link training 799, and physical packet processing block 793. The physical layer is coupled to a hard-IP link layer 781 through a Physical Interface for PCI Express (PIPE) 703. The physical layer transports packets between the link layers of two PCI Express agents. The hard-coded link layer 781 provides reliable delivery of packets across a PCI Express link. The link layer 781 includes a multiplexer/demultiplexer 789, a replay buffer and error checking mechanism 787, data link packet processing 785, and link packet processing 783. The link layer is responsible for data integrity and adds a sequence number and checksum information (CRC) to the transaction layer packet.

According to various embodiments, the transaction layer is implemented using both soft-IP layer 761 and hard-IP layer 771. Hard-IP layer 771 includes transaction layer packet generation 773. Soft-IP layer 761 includes mechanisms for flow control and ordering 765, virtual channel management mechanisms 769, and receive and transmit buffers per virtual channel 763 and 767. In some embodiments, configurable options associated with PCI express are implemented using soft logic. For example, a designer may wish to configure the number of virtual channels supported by a particular device. The designer may also wish to configure how flow control is implemented and whether traffic prioritization is supported. The size of the buffer per virtual channel can also be configured.

The transaction layer receives read and write requests from the software layer and creates request packets for transmission to the link layer. The transaction layer also receives response packets from the link layer and matches these with the original software requests. Each packet has an identifier that enables response packets to be directed to the correct originator. Packets can also have attributes such as "no-snoop," "relaxed ordering" and "priority," which may be used to route packets optimally through an I/O subsystem. The transaction layer is coupled to software layer 751.

A custom hard-IP/soft-IP interface 701 couples the hard-IP and soft-IP portions of a transaction layer. Although the techniques of the present invention recognize that providing a hard-IP/soft-IP interface at a transaction layer is beneficial, the hard-IP/soft-IP interface may also be configured at a different portion. For example, all transaction layer function can be implemented in soft-IP while physical layer and link layer operations are implemented using hard-IP. The hard-IP/soft-IP interface would then reside between the transaction and link layers. A PIPE interface 703 couples the physical and data link layers. The following tables show examples of the signals used to implemented a PIPE interface and a custom hard-IP soft-IP interface.

TABLE 1

Hard-IP PIPE Interface

| Signal | Inputs | Outputs | Description |
| --- | --- | --- | --- |
| Txdata | 4*M | 0 | Data lines from link layer to physical layer |
| TxDataK | 8 | 0 | Status signals from link to physical layer |
| Command | 7*N | 0 | Command signals from link to physical layer |
| Clock | 1 | 0 | Write clock |
| Rxdata | 0 | 4*M | Data lines from physical to link layer |
| RxDataK | 0 | 8 | Status signals from physical to link layer |
| Rcommand | 0 | 6*N | Command signals from physical to link layer |
| Pclock | 0 | 1 | Clock from physical to link layer |

Note: M = 8 or 16 bits. N = 1, 2, 3, 4

TABLE 2

Hard-IP/Soft-IP Custom Interface

| Signal | Inputs | Outputs | Description |
| --- | --- | --- | --- |
| Writedata | 4*M | 0 | Data lines for write transfers |
| Write | 4 | 0 | Write request signals |
| Write Address | 32*N | 0 | Address lines |
| Write Clock | 1 | 0 | Write clock |
| Tx_FIFO | S | S | Sideband signals for buffer management |
| Readdata | 0 | 4*M | Data lines for read transfers |
| Read | 0 | 4 | Read request signals |
| Read Address | 0 | 32*N | Address lines |
| Read Clock | 0 | 1 | Read clock |
| Rx_FIFO | S | S | Sideband signals for buffer management |

Note: M = 8 or 16 bits. N = 1, 2, 3, 4. S = 0 to 20.

Figure 8:
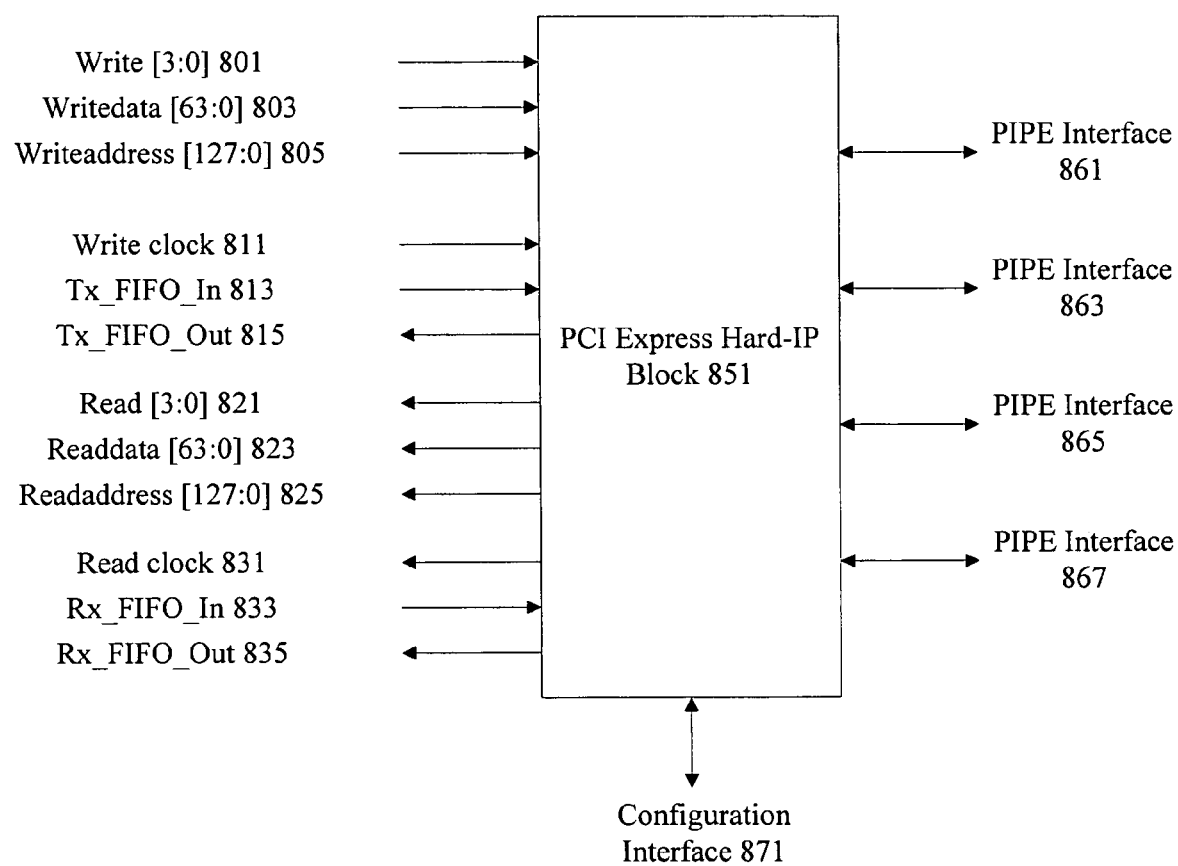
FIG. 8 is a diagrammatic representation showing a hard-IP soft-IP interface.

FIG. 8 is a diagrammatic representation showing a PCI Express Hard-IP block. The hard-IP block 851 includes multiple PIPE interfaces 861, 863, 865, and 867 coupled to a PCI Express physical layer. Multiple write lines 801, 803, 805, and 811, multiple read lines 821, 823, 825, and 831 and buffer management lines 813, 815, 833, and 835 are also provided. Configuration lines 871 are provided for initialization and management of the block. It should be noted that additional lines may also be provided. For example, a PCI Express block 851 may interface with a system bus.

Figure 9:
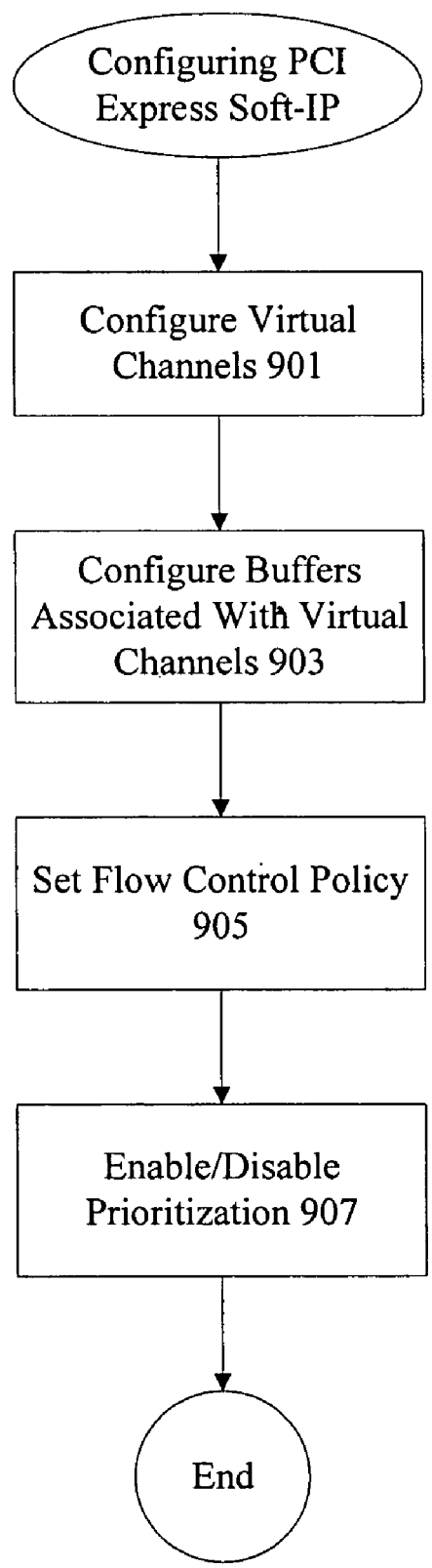
FIG. 9 is a flow process diagram showing a technique for customizing a device supporting PCI Express

FIG. 9 is a flow process diagram showing one technique for customizing a soft-IP transaction layer. At 901, virtual channels are configured. In one example, the designer selects the number of virtual channels supported on a particular device. At 903, buffers associated with each virtual channel are configured. A designer may select a buffer size suitable for a particular implementation. At 905, flow control policy is determined. Flow control policy may govern the amount of bandwidth allocated to particular flows. At 907, prioritization parameters are set. Prioritization allows certain classes of traffic to be given higher priority than other classes of traffic.

Although the techniques and mechanisms of the present invention are applicable to a variety of different devices including general purpose processors, video accelerators, cryptography accelerators, digital signal processors, microcontrollers, etc., the techniques and mechanisms of the present invention are particularly applicable to devices with hard-coded transceivers.

Figure 10:
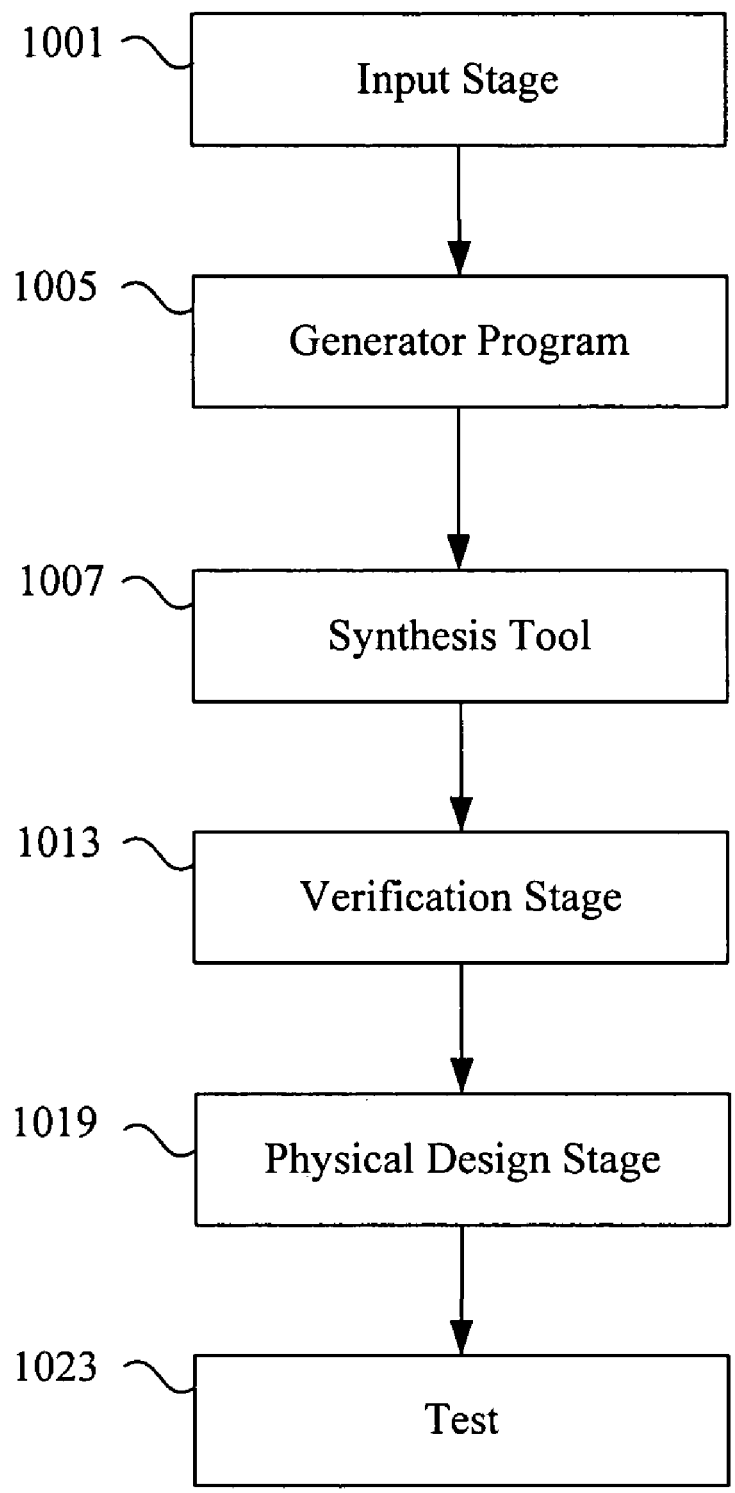
FIG. 10 is a diagrammatic representation showing a technique for implementing a programmable device.

FIG. 10 is a diagrammatic representation showing one example of implementing a hybrid device. An input stage 1001 receives selection information typically from a user for logic such as a processor core as well as other components such as a PCI Express core to be implemented on an electronic device. In one example, the input received is in the form of a high-level language program. A generator program 1005 creates a logic description and provides the logic description along with other customized logic to any of a variety of synthesis tools, place and route programs, and logic configuration tools to allow a logic description to be implemented on an electronic device.

In one example, an input stage 1001 often allows selection and parameterization of components to be used on an electronic device. For example, the input stage 1001 allows configuration of a PCI Express core. In some examples, components provided to an input stage include intellectual property functions, megafunctions, and intellectual property cores. The input stage 1001 may be a graphical user interface using wizards for allowing efficient or convenient entry of information. The input stage may also be a text interface or a program reading a data file such as a spreadsheet, database table, or schematic to acquire selection information. The input stage 1001 produces an output containing information about the various modules selected.

In typical implementations, the generator program 1005 can identify the selections and generate a logic description with information for implementing the various modules. The generator program 1005 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 1005 identifies pointers and provides ports for each pointer. One tool with generator program capabilities is System on a Programmable Chip (SOPC) Builder available from Altera Corporation of San Jose, Calif. The generator program 1005 also provides information to a synthesis tool 1007 to allow HDL files to be automatically synthesized. In some examples, a logic description is provided directly by a designer.

Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 1009.

As will be appreciated by one of skill in the art, the input stage 1001, generator program 1005, and synthesis tool 1007 can be separate programs. The interface between the separate programs can be a database file, a log, or simply messages transmitted between the programs. For example, instead of writing a file to storage, the input stage 1001 can send messages directly to the generator program 1005 to allow the generator program to create a logic description. Similarly, the generator program can provide information directly to the synthesis tool instead of writing HDL files. Similarly, input stage 1001, generator program 1005, and synthesis tool 1007 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1007.

A synthesis tool 1007 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1013 typically follows the synthesis stage 1007. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1013, the synthesized netlist file can be provided to physical design tools 1019 including place and route and configuration tools. A place and route tool typically locates logic cells on specific logic elements of a target hardware device and connects wires between the inputs and outputs of the various logic elements in accordance with logic required to implement an electronic design. The device can also be physically tested at 1023.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 1001, the generator program 1005, the synthesis tool 1007, the verification tools 1013, and physical design tools 1019 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 11:
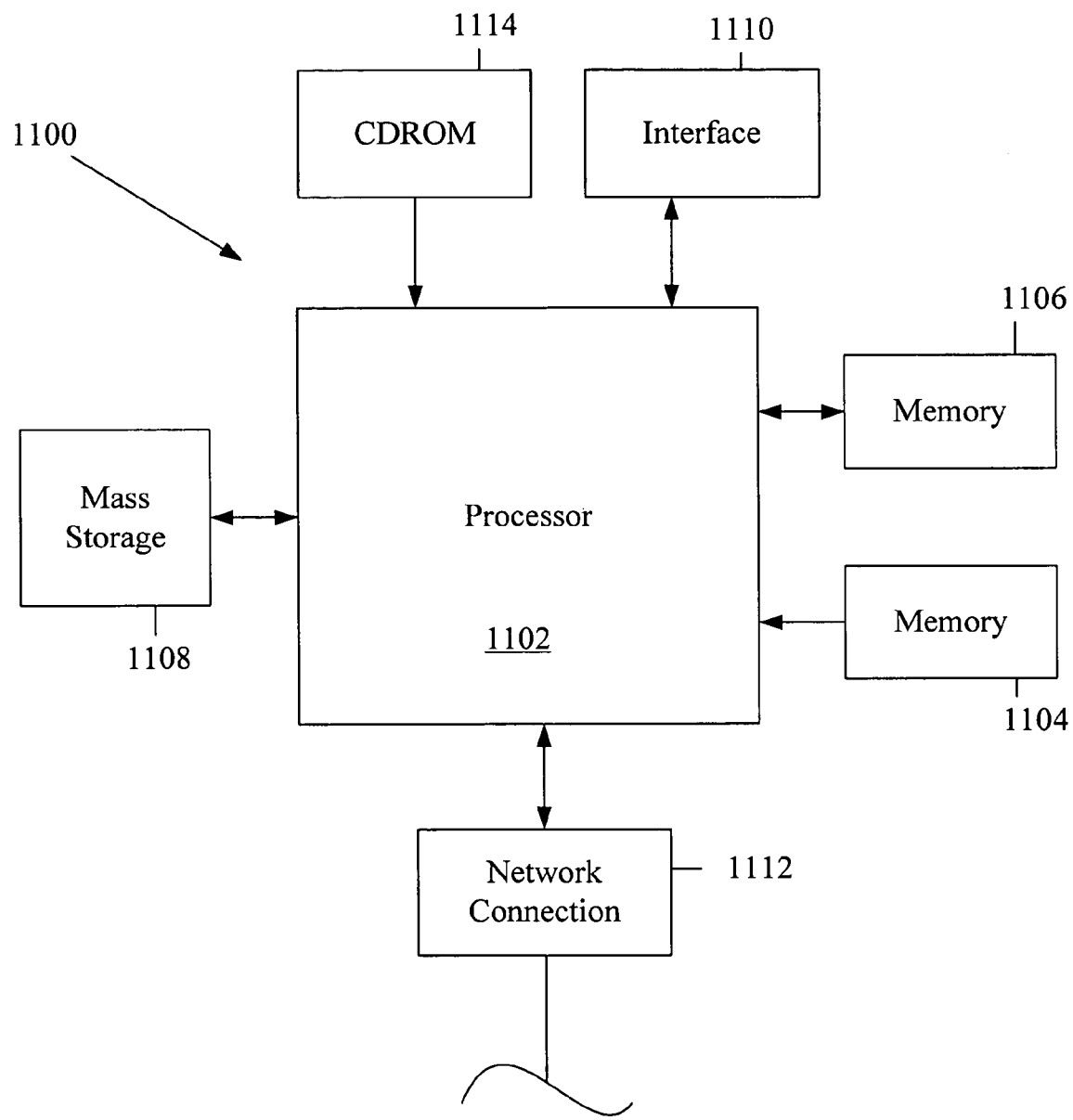
FIG. 11 is a diagrammatic representation showing a computer system.

FIG. 11 illustrates a typical computer system that can be used to implement a programmable chip. The computer system 1100 includes any number of processors 1102 (also referred to as central processing units, or CPUs) that are coupled to devices including memory 1106 (typically a random access memory, or "RAM"), memory 1104 (typically a read only memory, or "ROM"). The processors 1102 can be configured to generate a test sequences for any designated processor. As is well known in the art, memory 1104 acts to transfer data and instructions uni-directionally to the CPU and memory 1106 is used typically to transfer data and instructions in a bi-directional manner.

Both of these memory devices may include any suitable type of the computer-readable media described above. A mass storage device 1108 is also coupled bi-directionally to CPU 1102 and provides additional data storage capacity and may include any of the computer-readable media described above. The mass storage device 1108 may be used to store programs, data and the like and is typically a secondary storage medium such as a hard disk that is slower than memory. The mass storage device 1108 can be used to hold a library or database of prepackaged logic or intellectual property functions, as well as information on generating particular configurations. It will be appreciated that the information retained within the mass storage device 1108, may, in appropriate cases, be incorporated in standard fashion as part of memory 1106 as virtual memory. A specific mass storage device such as a CD-ROM 1114 may also pass data uni-directionally to the CPU.

CPU 1102 is also coupled to an interface 1110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1102 optionally may be coupled to a computer or telecommunications network using a network connection as shown generally at 1112. With such a network connection, it is contemplated that the CPU might receive information from the network, or might output information to the network in the course of performing the above-described method steps. It should be noted that the system 1100 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1108 or 1114 and executed on CPU 1108 in conjunction with primary memory 1106.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of device associated with transceivers. It is therefore intended that the invention be interpreted to include all variations and equivalents that fall within the true spirit and scope of the present invention.

What is claimed is:

1. A programmable chip, comprising:

hard-coded PCI Express physical layer circuitry, the hard-coded PCI Express physical layer circuitry configured to perform physical packet processing;

hard-coded PCI Express link layer circuitry coupled to the hard-coded PCI Express physical layer circuitry, the hard-coded PCI link layer circuitry operable to perform link packet processing;

soft-coded PCI Express transaction layer circuitry, the soft-coded PCI Express transaction layer circuitry customizable to provide support for a plurality of virtual channels; and hard-coded PCI Express transaction layer circuitry, the hard-coded PCI Express transaction layer circuitry operable to perform transaction layer packet processing.

2. The programmable chip of claim 1, wherein the hard-coded PCI Express transaction layer circuitry is coupled to the soft-coded PCI Express transaction layer circuitry using a hard-IP soft-IP interface.

3. The programmable chip of claim 2, wherein the hard-IP soft-IP interface includes write data lines, write request signals, write address lines, a write clock, and transmit sideband signals for buffer management.

4. The programmable chip of claim 3, wherein the hard-IP soft-IP interface includes read data lines, read request signals, read address lines, a read clock, and receive sideband signals for buffer management.

5. The programmable chip of claim 1, wherein the hard-coded PCI Express physical layer circuitry is coupled to the hard-coded PCI Express link layer circuitry using a PIPE interface.

6. The programmable chip of claim 1, wherein the hard-coded PCI Express physical layer circuitry, link layer circuitry, and transaction layer circuitry are implemented using a plurality of gates.

7. The programmable chip of claim 5, wherein the soft-coded PCI Express transaction layer circuitry is implemented using a plurality of lookup tables.

8. The programmable chip of claim 5, wherein the PIPE interface includes data lines, status signals, command signals, and a write clock from the hard-coded PCI Express data link layer to the hard-coded PCI Express physical layer.

9. The programmable chip of claim 5, wherein the PIPE interface includes data lines, status signals, command signals, and a clock from the hard-coded PCI Express physical layer to the hard-coded PCI Express data link layer.

10. The programmable chip of claim 1, further comprising a simultaneous multiple master component fabric.

11. The programmable chip of claim 1, further comprising a plurality of primary and secondary components.

12. The programmable chip of claim 1, wherein the soft-coded PCI Express transaction layer circuitry is further configured to implement flow control.

13. The programmable chip of claim 1, wherein the soft-coded PCI Express transaction layer circuitry is further configured to implement traffic shaping.

14. The programmable chip of claim 1, wherein the soft-coded PCI Express transaction layer circuitry is further configured to provide a plurality of customizable buffers per virtual channel.

15. A method for implementing a device supporting PCI Express, the method comprising:
providing hard-coded PCI Express physical layer circuitry, the hard-coded PCI Express physical layer circuitry configured to perform physical packet processing;
providing hard-coded PCI Express link layer circuitry coupled to the hard-coded PCI Express physical layer circuitry, the hard-coded PCI link layer circuitry operable to perform link packet processing;
implementing soft-coded PCI Express transaction layer circuitry, the soft-coded PCI Express transaction layer circuitry customizable to provide support for a plurality of virtual channels; and
providing hard-coded PCI Express transaction layer circuitry, the hard-coded PCI Express transaction layer circuitry operable to perform transaction layer packet processing.

16. The method of claim 15, further comprising coupling the hard-coded PCI Express transaction layer circuitry to the soft-coded PCI Express transaction layer circuitry using a hard-IP soft-IP interface.

17. The method of claim 16, further comprising including write data lines, write request signals, write address lines, a write clock, and transmit sideband signals for buffer management in the hard-IP soft-IP interface.

18. The method of claim 17, further comprising including read data lines, read request signals, read address lines, a read clock, and receive sideband signals for buffer management in the hard-IP soft-IP interface.

19. The method of claim 15, further comprising using a PIPE interface to couple the hard-coded PCI Express physical layer circuitry to the hard-coded PCI Express link layer circuitry.

20. The method of claim 15, further comprising using a plurality of gates to implement the hard-coded PCI Express physical layer circuitry, link layer circuitry, and transaction layer circuitry.

21. The method of claim 19, further comprising using a plurality of lookup tables to implement the soft-coded PCI Express transaction layer circuitry.

22. The method of claim 19, further comprising including data lines, status signals, command signals, and a write clock from the hard-coded PCI Express data link layer to the hard-coded PCI Express physical layer in the PIPE interface.

23. The method of claim 19, further comprising including data lines, status signals, command signals, and a clock from the hard-coded PCI Express physical layer to the hard-coded PCI Express data link layer in the PIPE interface.

24. The method of claim 15, further comprising providing a simultaneous multiple master component fabric.

25. The method of claim 15, further comprising providing a plurality of primary and secondary components.

26. The method of claim 15, further comprising configuring the soft-coded PCI Express transaction layer circuitry to implement flow control.

27. A system for implementing a device supporting PCI Express, the system comprising:
means for providing hard-coded PCI Express physical layer circuitry, the hard-coded PCI Express physical layer circuitry configured to perform physical packet processing;
means for providing hard-coded PCI Express link layer circuitry coupled to the hard-coded PCI Express physical layer circuitry, the hard-coded PCI link layer circuitry operable to perform link packet processing;
means for implementing soft-coded PCI Express transaction layer circuitry, the soft-coded PCI Express transaction layer circuitry customizable to provide support for a plurality of virtual channels; and
means for providing hard-coded PCI Express transaction layer circuitry, the hard-coded PCI Express transaction layer circuitry operable to perform transaction layer packet processing.

* * * * *